(12) United States Patent
Greenberg et al.

(10) Patent No.: US 10,300,889 B2
(45) Date of Patent: May 28, 2019

(54) IRIS-DETECTION ALIGNMENT FOR VEHICLE FEATURE ACTIVATION

(71) Applicant: Ford Global Technologies, LLC, Dearborn, MI (US)

(72) Inventors: Jeffrey Allen Greenberg, Ann Arbor, MI (US); Ali Hassani, Ann Arbor, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 15/699,566

(22) Filed: Sep. 8, 2017

(65) Prior Publication Data

US 2019/0077372 A1   Mar. 14, 2019

(51) Int. Cl.
| | |
|---|---|
| *H04N 7/00* | (2011.01) |
| *H04N 7/18* | (2006.01) |
| *B60R 25/25* | (2013.01) |
| *G06K 9/00* | (2006.01) |
| *B60R 1/00* | (2006.01) |
| *B60K 35/00* | (2006.01) |

(Continued)

(52) U.S. Cl.
CPC ............ *B60R 25/255* (2013.01); *B60K 35/00* (2013.01); *B60Q 1/24* (2013.01); *B60Q 1/2665* (2013.01); *B60Q 5/00* (2013.01); *B60R 1/00* (2013.01); *B60R 25/01* (2013.01); *B60R 25/23* (2013.01); *B60R 25/24* (2013.01); *B60R 25/243* (2013.01); *G06K 9/00604* (2013.01); *G06K 9/00617* (2013.01); *B60K 2350/1028* (2013.01); *B60K 2350/2052* (2013.01); *B60Q 2400/40* (2013.01); *B60R 2300/105* (2013.01); *B60R 2300/20* (2013.01); *B60R 2300/8073* (2013.01)

(58) Field of Classification Search
CPC .............. B60Q 1/0023; B60Q 2400/40; B60Q 2400/50; B60R 25/10; B60R 25/2054; B60R 25/241; B60R 25/255; B60R 25/305; B60T 17/18; B60T 7/12; E05F 2015/767; E05Y 2800/106; E05Y 2800/426; G06F 3/0425; G06F 3/04817; G07C 2209/65; G07C 9/00563; G07C 9/00658
See application file for complete search history.

(56) References Cited

U.S. PATENT DOCUMENTS

| | | | |
|---|---|---|---|
| 6,031,465 A | 2/2000 | Burgess | |
| 6,323,761 B1* | 11/2001 | Son .......................... | B60R 25/10 340/426.35 |

(Continued)

FOREIGN PATENT DOCUMENTS

DE    10113950 A1    9/2002

*Primary Examiner* — Jessica M Prince
(74) *Attorney, Agent, or Firm* — Frank Lollo; James P. Muraff; Neal, Gerber & Eisenberg LLP

(57) ABSTRACT

Method and apparatus are disclosed for iris-detection alignment for vehicle entry and feature activation. An example vehicle includes a window, a camera facing the window, a puddle lamp to project an indicator pointing toward the camera, a UV source, and a controller. The controller is to project, via the UV source, a display onto the window upon detecting a user aligns with the indicator. The controller also is to provide directions to the user, via the display, to position an iris in front of the camera and activate a vehicle feature upon identifying the user via iris recognition.

20 Claims, 6 Drawing Sheets

(51) Int. Cl.
*B60Q 1/24* (2006.01)
*B60Q 1/26* (2006.01)
*B60R 25/01* (2013.01)
*B60Q 5/00* (2006.01)
*B60R 25/24* (2013.01)
*B60R 25/23* (2013.01)

(56) References Cited

U.S. PATENT DOCUMENTS

| | | |
|---|---|---|
| 7,034,655 B2 | 4/2006 | Magner |
| 7,255,466 B2 | 8/2007 | Schmidt |
| 7,417,681 B2 | 8/2008 | Lieberman |
| 7,637,631 B2 | 12/2009 | McDermott |
| 8,064,647 B2 | 11/2011 | Bazakos |
| 8,640,946 B1 | 2/2014 | Block |
| 8,643,481 B2 | 2/2014 | Campbell |
| 8,922,388 B2 | 12/2014 | Nykerk |
| 8,937,528 B2 | 1/2015 | Protopapas |
| 8,994,495 B2 | 3/2015 | Dassanayake |
| 9,095,287 B2 | 8/2015 | Hanna |
| 9,150,123 B2 | 10/2015 | Jendritza |
| 9,518,408 B1 | 12/2016 | Krishnan |
| 9,563,998 B2 | 2/2017 | Hoyos |
| 9,707,912 B1 | 7/2017 | Peña Casimiro |
| 9,783,162 B2 | 10/2017 | Hoyos |
| 9,848,113 B2 | 12/2017 | Smits |
| 10,065,555 B2 * | 9/2018 | Abrams ............... B60Q 1/0023 |
| 2006/0056663 A1 | 3/2006 | Call |
| 2006/0145825 A1 | 7/2006 | McCall |
| 2006/0261272 A1 | 11/2006 | Yoshida |
| 2014/0015637 A1 * | 1/2014 | Dassanayake ..... G07C 9/00174 340/5.54 |
| 2014/0200737 A1 | 7/2014 | Lortz |
| 2017/0106836 A1 * | 4/2017 | Sobecki ................ G06F 3/0425 |
| 2017/0109511 A1 * | 4/2017 | Dass .................. G06K 9/00926 |

* cited by examiner

IRIS-DETECTION ALIGNMENT FOR VEHICLE FEATURE ACTIVATION

TECHNICAL FIELD

The present disclosure generally relates to vehicle entry and feature activation and, more specifically, to iris-detection alignment for vehicle entry and activation.

BACKGROUND

Typically, keys are utilized to open doors of a vehicle and to activate an engine of the vehicle. Traditionally, mechanical keys have been utilized to open vehicle doors and to activate vehicle engines. For instance, a mechanical key is inserted into a keyhole and rotated to open a door and/or to activate an engine. Recently, key fobs and phone-as-a-keys have been utilized to open vehicle doors and to activate vehicle engines. For instance, a key fob and a phone-as-a-key wirelessly communicate with a vehicle to unlock a vehicle door and/or to activate an engine.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for iris-detection alignment for vehicle entry and feature activation. An example disclosed vehicle includes a window, a camera facing the window, a puddle lamp to project an indicator pointing toward the camera, a UV source, and a controller. The controller is to project, via the UV source, a display onto the window upon detecting a user aligns with the indicator. The controller also is to provide directions to the user, via the display, to position an iris in front of the camera and activate a vehicle feature upon identifying the user via iris recognition.

An example disclosed method includes projecting, via a puddle lamp, an indicator pointing toward a vehicle camera that captures images through a vehicle window and projecting, via a UV source, a display onto the vehicle window upon detecting that a user aligns with the indicator. The example disclosed method also includes providing directions to the user, via the display, to position an iris in front of the vehicle camera and activating, via a processor, a vehicle feature upon identifying the user via iris recognition.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
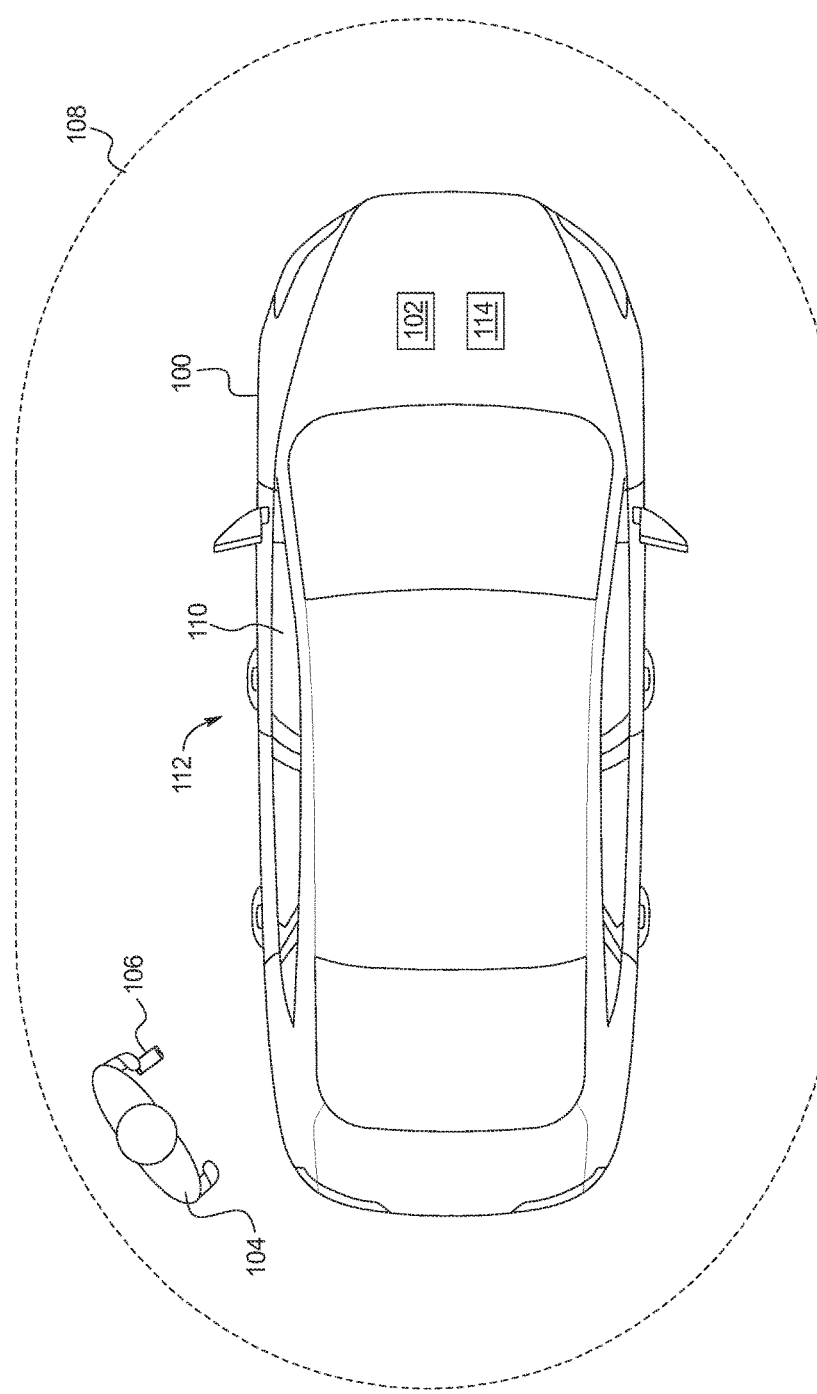
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, keys are utilized to open doors of a vehicle and to activate an engine of the vehicle. Traditionally, mechanical keys have been utilized to open vehicle doors and to activate vehicle engines. For instance, a mechanical key is inserted into a keyhole and rotated to open a door and/or to activate an engine. Key fobs and phone-as-a-keys have also been utilized to open vehicle doors and to activate vehicle engines. For instance, a key fob and a phone-as-a-key wirelessly communicate with a vehicle to unlock a vehicle door and/or to activate an engine.

As used herein, a "key fob" refers to an electronic device that wirelessly communicates with a vehicle to unlock/lock door(s), open/close door(s) and/or activate an engine of a vehicle. As used herein, a "phone-as-a-key" refers to a mobile device (e.g., a smart phone, a wearable, a smart watch, a tablet, etc.) that includes hardware and/or software to function as a key fob.

More recently, some vehicles have implemented iris recognition systems to identify whether a person located next to a vehicle is an authorized user of the vehicle. Typically, the person must stand at a particular location in front of a camera of the vehicle to enable the iris recognition system of the vehicle to perform iris recognition of the person. Example methods and apparatus disclosed herein detect when a user has approached a vehicle and projects a display (e.g., a UV display) onto a window of the vehicle to provide directions to the user for positioning his or her iris in front of a camera for iris recognition.

Examples disclosed herein include an iris recognition system (or other camera-based recognition system) of a vehicle for initiating vehicle features (e.g., unlocking doors, setting HVAC settings, etc.). The vehicle includes a camera located near a door (e.g., a driver-side door) of the vehicle that is configured to detect an iris (or face) of a user of the vehicle. The vehicle also includes a puddle lamp that projects an indicator (e.g., footprint guides) onto the ground in front of the door. The indicator point the user toward the camera. For example, the puddle lamp projects the footprints in response to the vehicle detecting that a key fob or a phone-as-a-key of the user that corresponds to the vehicle is near the vehicle. Additionally or alternatively, the puddle lamp projects the indicator in response to the vehicle detecting that the user has grasped a handle of the door in the absence of any keys being detected and/or to initiate vehicle personalization settings even when a key is detected. The iris recognition system detects that the user is in front of the door and facing the camera upon the camera detecting a face of the user and/or upon another camera detecting that the user's feet align with the footprints projected by the puddle lamp. Upon the iris recognition system detecting that the user is in front of and facing the camera, an ultraviolet (UV) source of the vehicle projects light in the ultraviolet spectrum (UV light) onto the window of the vehicle to produce a UV display from ink printed in the glass. The UV display includes indicators to direct the user to position his or her irises (or face) at a location at which the iris recognition system is capable of recognizing his or her irises via the image(s) captured by the camera.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

The vehicle 100 of the illustrated example includes a communication module 102. For example, the communication module 102 is a short-range communication module for wireless communication with mobile device(s) (e.g., key fobs, phone-as-a-keys, etc.) of user(s) of the vehicle 100 via a wireless personal area network. In the illustrated example, a user 104 of the vehicle 100 is carrying a key fob 106 that is communicatively connected to the communication module 102 of the vehicle 100. In other examples, the user 104 is carrying a phone-as-a-key (Paak) that is communicatively connected to the communication module 102 of the vehicle 100.

The communication module 102 includes hardware and firmware to establish a connection with the key fob 106. In some examples, the communication module 102 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. In other examples, the communication module 102 may use WiFi, WiMax, NFC, UWB (Ultra-Wide Band), and/or any other communication protocol for a personal wireless area network, a wireless local area network, etc. that enables the communication module 102 to communicatively couple to the key fob 106.

Prior to communicating with the key fob 106, the communication module 102 may authenticate the key fob 106 for communication with the communication module 102. To authenticate communication between the communication module 102 and the key fob 106, the communication module 102 intermittently broadcasts a beacon (e.g., a low-energy beacon such as Bluetooth® low-energy (BLE) beacon). When the key fob 106 is within a broadcast range 108 of the communication module 102, the key fob 106 receives the beacon and subsequently sends an authentication key code transmission. The communication module 102 authenticates the key fob 106 for the communication module 102 upon receiving the authentication key from the key fob 106. In other examples, the key fob 106 broadcasts a beacon and the communication module 102 subsequently receives the beacon to authenticate communication between the key fob 106 and the communication module 102.

As illustrated in FIG. 1, the vehicle 100 also includes a door 110 and an iris recognition system 112 adjacent to the door 110. In the illustrated example, the door 110 is a front, driver-side door of the vehicle 100. Additionally or alternatively, the vehicle 100 may include an iris recognition system (e.g., the iris recognition system 112) adjacent to one or more other doors of the vehicle 100 (e.g., one or more of the passenger doors).

The iris recognition system 112 of the illustrated example activates vehicle feature(s) of the vehicle 100 upon determining that an iris of the user 104 (e.g., an iris 406 of FIG. 4) corresponds to an iris of an authorized operator of the vehicle 100. That is, the iris recognition system 112 collects and processes image(s) of the iris of the user 104 to determine that the user 104 is an authorized user of the vehicle 100. Additionally or alternatively, the vehicle 100 includes other camera-based recognition system(s) (e.g., a facial recognition system, a facial blood floor heart rate signature recognition system, etc.) that activates the vehicle feature(s) of the vehicle 100 upon determining that a face of the user 104 corresponds to a face of an authorized operator of the vehicle 100.

Upon determining that the user 104 is authorized to operate the vehicle 100, the iris recognition system 112 (or other camera-based recognition system such as a facial recognition system, a heart rate signature recognition system, etc.) activates one or more vehicle features of the vehicle 100. For example, the vehicle features include vehicle entry features, such as unlocking and/or opening the door 110 to enable vehicle entry of the user 104 into a cabin of the vehicle 100. Additionally or alternatively, the vehicle features include initiating setting(s) of an HVAC system, interior lights, and/or any other vehicle feature to personalized setting(s) that correspond to the user 104.

In the illustrated example, the iris recognition system 112 includes an identification controller 114. For example, the identification controller 114 provides directions to the user 104 to position the user 104 and/or the iris of the user in front of an iris-detection camera (e.g., a camera 206 of FIG. 2). Further, the identification controller 114 determines whether the iris of the user 104 corresponds to an iris of an authorized operator of the vehicle 100 and activates one or more vehicle features upon identifying the user 104, via iris recognition, as an authorized user.

Figure 2:
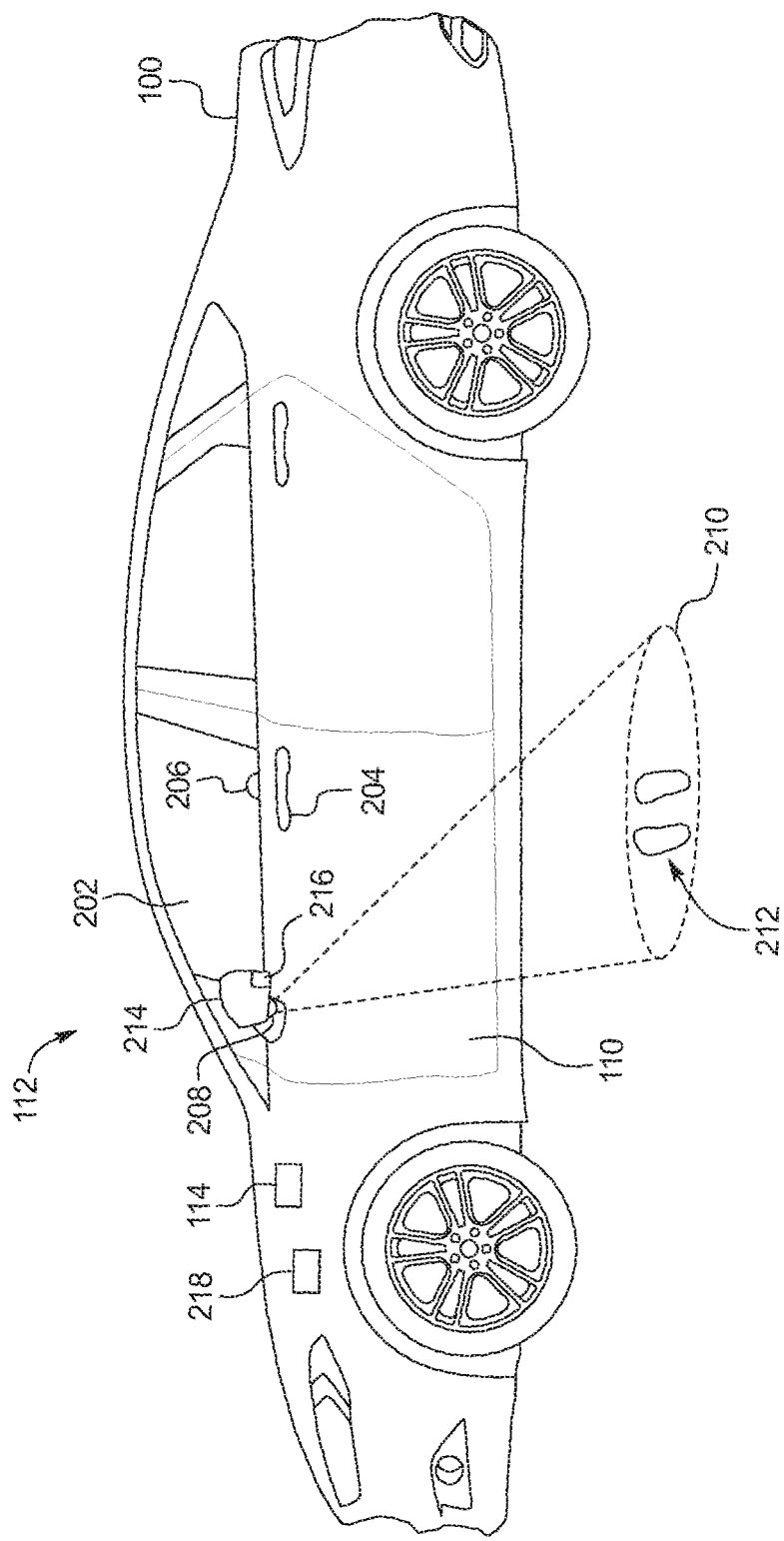
FIG. 2 depicts a side view of the vehicle of FIG. 1.

FIG. 2 depicts a side view of the vehicle 100. As illustrated in FIG. 2, the door 110 of the vehicle 100 includes a window 202 and a handle 204 (i.e., a door handle) adjacent to the window 202. Further, the vehicle 100 of the illustrated example includes a camera 206 (e.g., a first camera) of the iris recognition system 112 (or other camera-based recognition system such as a facial recognition system, a heart rate signature recognition system, etc.) that is positioned within the vehicle cabin and is facing the window 202 to capture image(s) and/or video through the window 202. In operation, the camera 206 captures image(s) of an iris (e.g., an iris 406 of FIG. 4) of the user 104 when the user is positioned in front of the camera 206 outside of the door 110. Further, the identification controller 114 determines, via iris recognition software and the image(s) captured by the camera 206, whether the user 104 is an authorized user of the vehicle 100. Upon determining that the user 104 is an authorized user, the identification controller 114 activates one or more vehicle features of the vehicle 100 for the user 104.

For example, the vehicle 100 includes a puddle lamp 208 of the iris recognition system 112 that projects a puddle light 210 onto an exterior ground surface adjacent to the door 110 of the vehicle 100. As illustrated in FIG. 2, the puddle light 210 includes an indicator 212 that provides directions to the user 104 for positioning in front of the camera 206 for iris recognition. The indicator 212 may be made up of light such that the image is light, or the indicator 212 may be defined by the absence of light such that light constitutes a defined pattern and the indicator 212 is dark or void of light. For example, the puddle lamp 208 projects the indicator 212 of the puddle light 210 at a predetermined location at which the user 104 is to stand to enable the camera 206 to capture image(s) of the iris of the user 104. For example, the puddle light 210 instructs the user 104 to stand a predetermined distance away from the camera 206 of the iris recognition system 112. Further, the indicator 212 points in a direction toward the camera 206 to instruct the user 104 to face the camera 206 to enable the camera 206 to capture image(s) of the iris of the user 104. That is, the indicator 212 of the puddle light 210 instructs the user 104 to stand at a predetermined location in a predetermined orientation relative to the camera 206 that enables the camera 206 to capture image(s) of the iris of the user 104 utilized by the iris recognition system 112. In the illustrated example, the puddle lamp 208 is positioned on a sideview mirror 214 that is adjacent to the door 110. In some examples, the puddle lamp 208 may be mounted on a stationary portion of the sideview mirror 214 to prevent the orientation of the puddle light 210 from changing upon the user 104 folding the sideview mirror 214. In some examples, the puddle lamp 208 is mounted on a movable portion of the sideview mirror 214 that automatically folds upon locking the door 110. In such examples, the sideview mirror 214 unfolds when iris recognition is initiated. In other examples, the puddle lamp 208 may be positioned at any other location of the vehicle 100 that enables the puddle light 210 to be projected onto the ground surface next to the door 110.

In the illustrated example, the puddle lamp 208 projects the puddle light 210 including the indicator 212 in response to the identification controller 114 detecting that the key fob 106 of the user 104 is nearby and is associated with a user profile (e.g., a biometric personalization account) of the user 104 for the vehicle 100. For example, the identification controller 114 detects that the key fob 106 is nearby when the communication module 102 of the vehicle 100 communicates with the key fob 106 of the user 104. That is, the identification controller 114 detecting that the key fob 106 is nearby when the key fob 106 is within the broadcast range 108 of the communication module 102. Further, in some examples, the identification controller 114 detects that the key fob 106 is nearby when the communication module 102 receives a signal from the key fob 106 to unlock or open the door 110 via a remote key access system. Once the puddle lamp 208 projects the indicator 212 onto the ground surface, the user 104 is provided with directions to stand at a predefined location and a predefined orientation in front of the camera 206.

Further, the camera 206 of the illustrated example is configured to capture image(s) through the window 202 in a direction toward the indicator 212 to enable the identification controller 114 to detect whether the user 104 aligns with the indicator 212. That is, the identification controller 114 is capable of determining whether the user 104 is positioned at the predetermined location in the predetermined orientation that enables the camera 206 to capture image(s) of the iris of the user 104 based upon a position and/or orientation of a face, a torso, a waist, legs, feet, and/or any combination thereof of the user 104 within the image(s) captured by the camera 206.

Additionally or alternatively, the vehicle 100 includes another camera 216 (e.g., a second camera) that is configured to capture image(s) of the indicator 212. The camera 216 also is configured to capture image(s) of legs and/or feet of the user 104 when the user 104 is aligned with and/or near the indicator 212 to enable the identification controller 114 to detect whether the user 104 aligns with the indicator 212. That is, the identification controller 114 is capable of determining whether the user 104 is positioned at the predetermined location in the predetermined orientation that enables the camera 206 to capture image(s) of the iris of the user 104 based upon a position and/or orientation of the legs and/or the feet of the user 104 relative to the indicator 212 within the image(s) captured by the camera 206. In the illustrated example, the camera 216 is positioned on the sideview mirror 214 next to the puddle lamp 208. In other examples, the camera 216 may be positioned at any other location on the vehicle 100 that enables the camera 216 to capture image(s) of the puddle light 210 and/or legs and/or feet of the user 104 standing on the puddle light 210.

In some examples, the identification controller 114 provides instructions to the user 104 to facilitate alignment with the indicator 212 and/or provides an alert to the user 104 when the user 104 has become aligned with the indicator 212. For example, the vehicle 100 includes speakers 218 that provide audible instructions and/or alerts for the alignment of the user 104 with respect to the indicator 212. In some examples (e.g., with smart fobs or BLE devices), the alert may be sent to the key fob 106 as an audible confirmation. Additionally or alternatively, the puddle light 210 provides visual instructions and/or alerts. For example, the indicator 212 changes color (e.g., from red to green) when the user 104 becomes aligned with the indicator 212.

Upon determining that the position and orientation of the user 104 aligns with the indicator 212 of the puddle light 210, the identification controller 114 projects a display (e.g., a UV display 410 of FIG. 4) onto the window 202. As disclosed in further detail below, the identification controller 114 provides instructions, via the display, to the user 104 to facilitate the user 104 in positioning his or her iris (or face) at a position in front of the camera 206 that enables the camera 206 to capture image(s) for utilization by the iris recognition system 112 (or other camera-based recognition system such as a facial recognition system, a heart rate signature recognition system, etc.). In response to determining, via iris recognition, that the user 104 is an authorized user of the vehicle 100, the identification controller 114 activates a vehicle feature for the user 104. For example, the identification controller 114 is configured to initiate vehicle feature(s) (e.g., an HVAC system, interior lights, etc.) to personalized setting(s) of the user 104 based upon a user profile (e.g., a biometric personalization account) of the user 104.

In other examples, the identification controller 114 of the illustrated example detects a presence of the user 104 upon the user 104 grasping the handle 204 of the door 110. That is, the identification controller 114 is configured to detect the user 104 without detecting the key fob 106 and/or any other key of the user 104 (e.g., via a keyless detection system). For example, the identification controller 114 detects the presence of the user 104 via the handle 204 when the user 104 does not have the key fob 106 and/or when the key fob 106 is not associated with a user profile (e.g., a biometric personalization account). In response to detecting that the user 104 has grasped the handle 204, the identification controller 114 projects a display (e.g., a UV display 410 of FIG. 4) onto the window 202.

In some such examples, the display projected by the identification controller 114 upon detection of the handle 204 being grasped includes instructions to the user 104 to facilitate the user 104 in positioning his or her iris (or face) at a position in front of the camera 206. In response to determining, via iris recognition (or other camera-based recognition system such as a facial recognition system, a heart rate signature recognition system, etc.), that the user 104 is an authorized user of the vehicle 100, the identification controller 114 activates a vehicle feature for the user 104. For example, the identification controller 114 sets vehicle feature(s) to personalized setting(s) of the user 104 unlocks and/or opens the door 110 to facilitate entry into the cabin of the vehicle 100.

In other such examples, the display projected by the identification controller 114 upon detection of the handle 204 being grasped includes a keypad. That is, the identification controller 114 is configured to project a keypad onto the window 202 in response to detecting that the user 104 has grasped the handle 204.

The keypad includes buttons for receiving a code from the user 104. For example, the buttons of the keypad are labeled with characters (e.g., numeric characters, alphabetic characters, alphanumeric characters) to enable the user 104 to identify each of the buttons. In some examples, a one button of the keypad is labeled "1-2," another button is labeled "3-4," another button is labeled "5-6," another button is labeled "7-8," and another button is labeled "9-0" to enable the user to enter a numeric code. For example, the camera 206 captures light reflected off the finger of the user 104 to enable the identification controller 114 to determine which key of the virtual keypad the user 104 has selected. While the keypad of the illustrated example is a virtual keypad projected onto the window 202 of the door 110, the keypad may be a physical keypad that is positioned at any location along an exterior surface of the vehicle 100.

In some examples, the vehicle 100 includes a key pad (e.g., a UV keypad, a physical keypad) and a master code (e.g., identified in a card tucked in the factory printed owner's manual). The user 104 utilizes the master code to add one or more personal keypad codes. For example, there may be different personalization settings associated which each added personal key code. In some instances, a user 104 may set his or her personalization setting(s) to be associated with the key fob 106 and/or the iris recognition system 112 but has failed to program a personal keypad code. After the keypad receives a code from the user 104, the identification controller 114 determines whether the received code corresponds to an authorized code (e.g., a personalized code, a master code). For example, in response to determining that the keypad has received a first code from the user 104, the identification controller 114 unlocks and/or opens the door 110 to enable the user 104 to enter the vehicle 100 and/or implements personalized setting(s) associated with the code. For example, if the received code (e.g., a second code) is associated with a biometric account, the identification controller activates iris recognition and the door 110 remains unlocked until the iris recognition system 112 recognizes and authenticates the user 104. In some examples in which the received code is a master code or a code associated with the user 104 that includes no personalization settings, the identification controller 114 prompts the user 104 to accept an option to perform iris recognition to enable personalization of settings. In some examples in which the received code is a master code or a code associated with the user 104 that includes no personalization settings, the identification controller 114 activates iris recognition (e.g., including displaying the indicator 212). In some examples, the identification controller 114 provides an audible alert and/or an audible spoken messages. In some examples, the door 110 remains locked during until iris recognition is performed. Further, in some such examples the identification controller 114 unlocks the door 110 without personalizing setting(s) upon detecting that the user 104 has pulled on the handle 204 for a predetermined period of time (e.g., 2 seconds). In response to determining that iris recognition has been prompted upon receipt of a received code (e.g., a second code) from the user 104, the identification controller 114 provides directions to the user 104, via the display on the window 202, to facilitate the user in positioning his or her iris (or face) at a position in front of the camera 206. In response to determining, via iris recognition (or other camera-based recognition system such as a facial recognition system, a heart rate signature recognition system, etc.), that the user 104 is an authorized user of the vehicle 100, the identification controller 114 sets vehicle feature(s) to personalized setting(s) of the user 104.

For example, the iris recognition system 112 (or other camera-based recognition system such as a facial recognition system, a heart rate signature recognition system, etc.) is utilized for vehicle personalization and secure biometric access. Upon activating the iris recognition system 112, the user 104 would direct an iris (or face) to the camera 216 of the vehicle 100. The iris recognition system 112 assists the user 104 in aligning the iris with the camera 216. In some examples, the user 104 is able to associate the key fob 106 and/or a code (e.g., for entering via the keypad) for a fobless entry and ignition (FEI) system with a user profile (e.g., a biometric personalization account) of the user 104 (e.g., to facilitate a standard illuminated entry sequence being utilized when a non-personalization associated key is detected).

In some examples, the process of activation (e.g., approach-detection activation) for personalization will be tied to key detection of the key fob 106. The ID of the key fob 106 is compared against the list of personalization accounts to determine if iris recognition (or other camera-based recognition such as facial recognition, heart rate signature recognition, etc.) is to be utilized. If a non-personalization key is detected, a standard illuminated entry sequence may begin. (e.g., parking lights will illuminate, a standard puddle lamp will illuminate, etc.). If a personalization key (e.g., the key fob 106 of the user 104) is detected, the iris recognition system 112 (or other camera-based recognition system such as a facial recognition system, a heart rate signature recognition system, etc.) will initiate (e.g., by projecting the puddle light 210 including the indicator 212 onto the ground surface).

In some examples, the process of activation (e.g., manual activation of personalized access via a key) will begin upon the user 104 grasping the handle 204 of the door 110 and/or pressing an unlock button on the key fob 106. In some examples, standard illuminated entry process will proceed if a non-personalization key is detected. In some examples, the iris recognition system 112 (or other camera-based recognition system such as a facial recognition system, a heart rate signature recognition system, etc.) will proceed if the key fob 106 is associated with personalized access.

In some examples in which the vehicle 100 includes an FEI system, the process of activation (e.g., manual activation of personalized access via an FEI system) will begin upon the user 104 grasping the handle 204 of the door without the presence of a key. In some examples, the user 104 may opt to utilize the iris recognition system 112 (or other camera-based recognition system such as a facial recognition system, a heart rate signature recognition system, etc.) for the FEI system in which successful recognition of the user 104 would both grant entry into the vehicle 100 and prime the vehicle 100 for an ignition code. In such examples, the iris recognition system 112 will begin immediately upon the user 104 grasping the handle 204. Further, in some examples, the user 104 may choose to utilize the iris recognition system 112 for personalizing the FEI system. In such examples, the keypad is presented to the user 104 and receives a code from the user 104. If the code is a non-personalized code, the iris recognition system 112 will unlock the door 110. If the code is a personalized code, the iris recognition system 112 will initiate iris recognition of the user 104.

In some examples, the process of activation (e.g., manual activation of secure biometric access without ignition) will begin upon the user 104 grasping the handle 204 of the door without the presence of a key. The iris recognition system 112 (or other camera-based recognition system such as a facial recognition system, a heart rate signature recognition system, etc.) will begin immediately by projecting the indicator 212 onto the ground surface. In some examples, iris recognition may be canceled upon the user 104 pulling the handle 204 for a predetermined period of time (e.g., 2 seconds). In some such examples, the keypad will be presented to the user 104 upon the iris recognition being canceled.

Figure 3:
FIG. 3 illustrates footprints emitted by a puddle lamp of the vehicle of FIG. 1.

FIG. 3 illustrates example footprints 300. Each of the footprints 300 of the illustrated example may be the indicator 212 of the puddle light 210 that is projected onto the ground surface. That is, the indicator 212 of FIG. 2 that is projected by the puddle lamp 208 includes one of the footprints 300 that are directed toward the camera 206 to instruct the user 104 to face the camera 206 of the iris recognition system 112. In some examples, the footprints 300 of the indicator 212 are personalized for the user 104 (e.g., based upon the key fob 106 detected via the communication module 102). The desired foot print image can be pre-selected by the vehicle owner based on personal preference or the system may be designed to be adaptive such that over time, images collected from camera 216 could be used to project images that best match the shoes or feet camera 216 normally sees in the puddle light 210.

Figure 4:
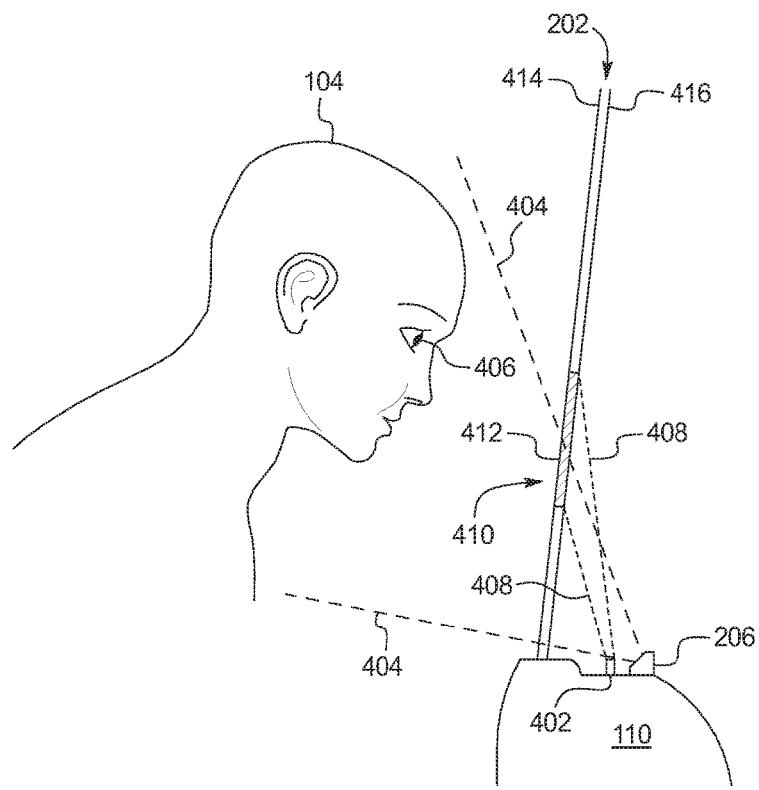
FIG. 4 illustrates a camera and a UV source of an iris recognition system of the vehicle of FIG. 1.

FIG. 4 depicts a side view of the iris recognition system 112 (or other camera-based recognition system such as a facial recognition system, a heart rate signature recognition system, etc.) of the vehicle 100. As illustrated in FIG. 4, the iris recognition system 112 includes the camera 206 and UV source 402 that are positioned on an interior surface of the door 110 adjacent to the window 202. In the illustrated example, the camera 206 is oriented in a direction toward the window 202 and has a field of view 404 for capturing image(s) of an iris 406 and/or any other portion (e.g., a face, a torso, legs) of the user 104 when the user 104 is aligned with the indicator 212 of the puddle light 210. Further, the UV source 402 emits UV light 408 (i.e., light in the ultraviolet spectrum) onto the window 202 to produce a UV display 410 on the window 202. The UV source 402 is a UV LED and/or any other device that is configured to emit the UV light 408 onto the window 202.

The identification controller 114 projects, via the UV source 402, the UV display 410 onto the window 202 upon detecting that the user 104 is aligned with the indicator 212. For example, the identification controller 114 provides directions to the user 104, via the UV display 410, that facilitate the user 104 in positioning the iris 406 (or face) at a location within the field of view 404 of the camera 206 that enables the identification controller 114 to perform iris recognition (or other camera-based recognition system such as a facial recognition system, a heart rate signature recognition system, etc.). Additionally or alternatively, the UV display 410 presented via the identification controller 114 includes a keypad that enables the user 104 to enter a code.

As illustrated in FIG. 4, the window 202 includes a UV ink layer 412 that is positioned between an outer layer 414 (e.g., a first outer layer) and another outer layer 416 (e.g., a second outer layer). For example, the outer layer 414 and the outer layer 416 are formed of laminated glass. In other examples, the outer layer 414 is glass and the outer layer 416 is a film. The UV ink layer 412 reflects visible light when the UV source 402 projects the UV light 408 onto the UV ink layer 412 to create the UV display 410 on the window 202. For example, the UV ink layer 412 includes paint, dye, and/or other material that is sensitive and/or reactive to the UV light 408. In some examples, the UV ink layer 412 includes various paints, dyes, and/or other materials that respond to lights of different wavelengths differently to produce different colors of the UV display 410.

In the illustrated example, the iris recognition system 112 (or other camera-based recognition system such as a facial recognition system, a heart rate signature recognition system, etc.) includes the UV source 402 that emits the UV light 408 to produce the UV display 410 on the window 202. In other examples, the iris recognition system 112 includes a near-infrared (NIR) light source that emits NIR light to produce a NIR display on the window 202. In some examples, NIR light may be utilized by the iris recognition system 112 when an ambient light of the vehicle 100 is below a predetermined threshold. Further, any other light source that is capable of producing an interactive display on the window 202 may be utilized by the iris recognition system 112.

Figure 5:
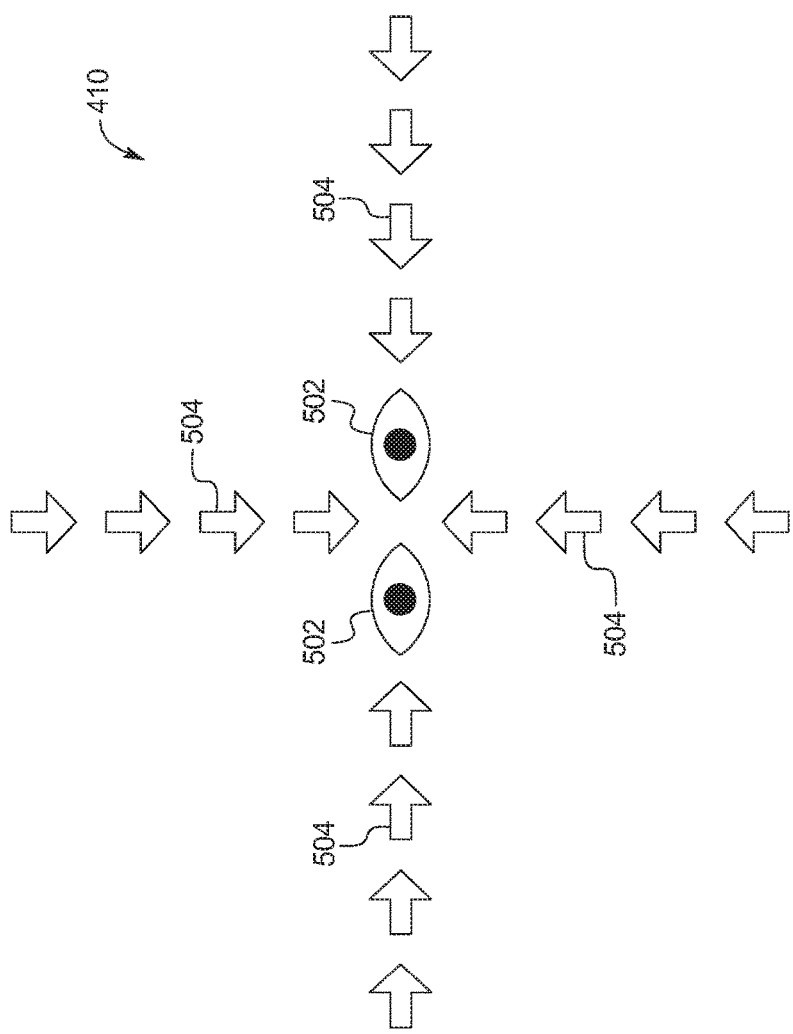
FIG. 5 illustrates guide lights projected by the UV source of FIG. 4 for iris alignment with respect to the camera of FIG. 4.

FIG. 5 illustrates an example of the UV display 410 that includes directions 500 (i.e., visual directions) to facilitate the user 104 in positioning the iris 406 (or face) at a position at which the camera 206 is capable of capturing image(s) for iris recognition (or other camera-based recognition system such as a facial recognition system, a heart rate signature recognition system, etc.). As illustrated in FIG. 5, the directions 500 includes a set of eyes 502 and one or more lines of indicators 504. That is, the UV display 410 includes the set of eyes 502 and/or one or more of the lines of indicators 504 that direct the user 104 in positioning the iris 406 in front of the camera 206. For example, the identification controller 114 changes a color of the set of eyes 502 (e.g., from red to green) to indicate to the user 104 when the iris 406 is in position for iris recognition. Additionally or alternatively, the lines of indicators 504 include arrows that direct the user 104 in positioning the iris 406 for iris recognition. For example, one or more of the leftward facing arrows activate (e.g., brighten, blink, etc.) if the user 104 needs to move the iris 406 to the left, one or more of the downward facing arrows activate if the user 104 needs to move the iris 406 downward, etc. Further, in the illustrated example, more of the arrows of the lines of indicators 504 activate when the iris 406 is farther away from the position for iris recognition, and less of the arrows of the lines of indicators 504 activate when the iris 406 is closer to the position for iris recognition. Additionally or alternatively, the identification presents audio instructions (e.g., via the speakers 218) to the user 104 to facilitate the user 104 in positioning the iris 406 for iris recognition.

Figure 6:
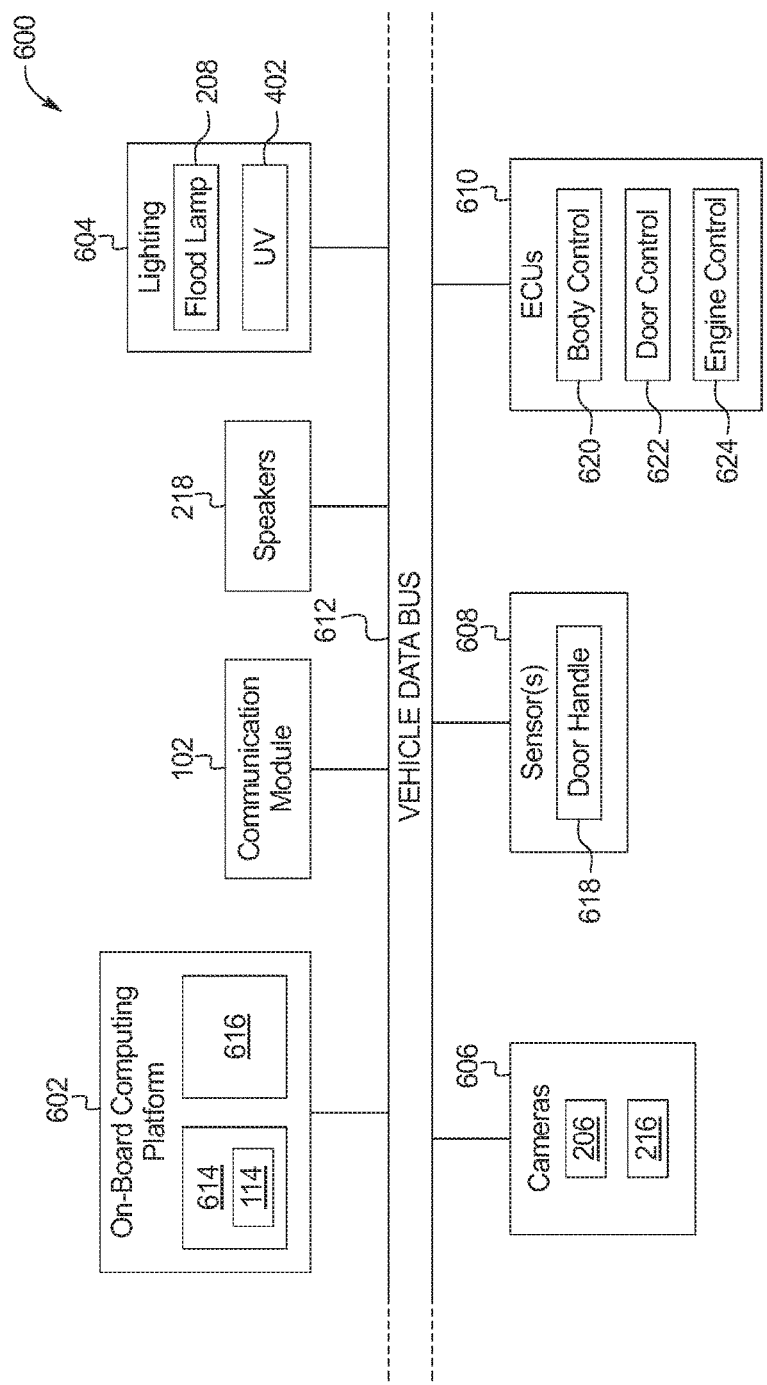
FIG. 6 is a block diagram of electronic components of the vehicle of FIG. 1.

FIG. 6 is a block diagram of electronic components 600 of the vehicle 100. As illustrated in FIG. 1, the electronic components 600 include an on-board computing platform 602, the communication module 102, the speakers 218, lighting 604, cameras 606, one or more sensors 608, electronic control units (ECUs) 610, and a vehicle data bus 612.

The on-board computing platform 602 includes a microcontroller unit, controller or processor 614 and memory 616. In some examples, the processor 614 of the on-board computing platform 602 is structured to include identification controller 114. Alternatively, in some examples, the identification controller 114 incorporated into another electronic control unit (ECU) with its own processor 614 and memory 616. The processor 614 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 616 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 616 includes multiple kinds of memory, particularly volatile memory and non-volatile memory.

The memory 616 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 616, the computer readable medium, and/or within the processor 614 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The lighting 604 of the vehicle 100 emits light, such as visible light, ultraviolet light, near-infrared light, etc. As illustrated in FIG. 6, the lighting 604 includes the puddle lamp 208 and the UV source 402. The puddle lamp 208 projects the indicator 212 onto the ground surface next to the door 110 and the window 202 of the vehicle 100. Further, the UV source 402 emits UV light (i.e., light in the ultraviolet spectrum) onto the UV ink layer 412 of the window 202 to produce the UV display 410.

The cameras 606 capture image(s) and/or video of area(s) within and/or surrounding the vehicle 100. For example, one or more of the cameras 606 capture image(s) and/or video that are presented to occupant(s) of the vehicle 100 and/or utilized to facilitate performance of autonomous and/or semi-autonomous driving maneuvers of the vehicle 100. In the illustrated example, the cameras 606 include the camera 206 and the camera 216. The camera 206 is utilized to monitor the position and/or orientation of the user 104 and/or to capture image(s) of the iris 406 of the user 104. Further, the camera 216 is utilized to monitor the position and/or orientation of the user 104 in front of the camera 206.

The sensors 608 are arranged in and around the vehicle 100 to monitor properties of the vehicle 100 and/or an environment in which the vehicle 100 is located. One or more of the sensors 608 may be mounted to measure properties around an exterior of the vehicle 100. Additionally or alternatively, one or more of the sensors 608 may be mounted inside a cabin of the vehicle 100 or in a body of the vehicle 100 (e.g., an engine compartment, wheel wells, etc.) to measure properties in an interior of the vehicle 100. For example, the sensors 608 include accelerometers, odometers, tachometers, pitch and yaw sensors, wheel speed sensors, microphones, tire pressure sensors, biometric sensors and/or sensors of any other suitable type. In the illustrated example, the sensors 608 include a door handle sensor 618 that detects when the user 104 grasps the handle 204 of the door 110.

The ECUs 610 monitor and control the subsystems of the vehicle 100. For example, the ECUs 610 are discrete sets of electronics that include their own circuit(s) (e.g., integrated circuits, microprocessors, memory, storage, etc.) and firmware, sensors, actuators, and/or mounting hardware. The ECUs 610 communicate and exchange information via a vehicle data bus (e.g., the vehicle data bus 612). Additionally, the ECUs 610 may communicate properties (e.g., status of the ECUs 610, sensor readings, control state, error and diagnostic codes, etc.) to and/or receive requests from each other. For example, the vehicle 100 may have seventy or more of the ECUs 610 that are positioned in various locations around the vehicle 100 and are communicatively coupled by the vehicle data bus 612.

In the illustrated example, the ECUs 610 include a body control module 620, a door control unit 622, and an engine control unit 624. For example, the body control module 620 controls one or more subsystems throughout the vehicle 100 (e.g., an immobilizer system, etc). For example, the body control module 620 includes circuits that drive one or more of relays (e.g., to control wiper fluid, etc.), brushed direct current (DC) motors (e.g., to control power seats, wipers, etc.), stepper motors, LEDs, etc. The door control unit 622 is utilized to monitor and control electronic components and/or systems of a door (e.g., the door 110) of the vehicle 100. Further, the engine control unit 624 controls operation (e.g., remote starting) of an engine of the vehicle 100.

The vehicle data bus 612 communicatively couples the communication module 102, the speakers 218, the on-board computing platform 602, the lighting 604, the cameras 606, the sensors 608, and the ECUs 610. In some examples, the vehicle data bus 612 includes one or more data buses. The vehicle data bus 612 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 7:
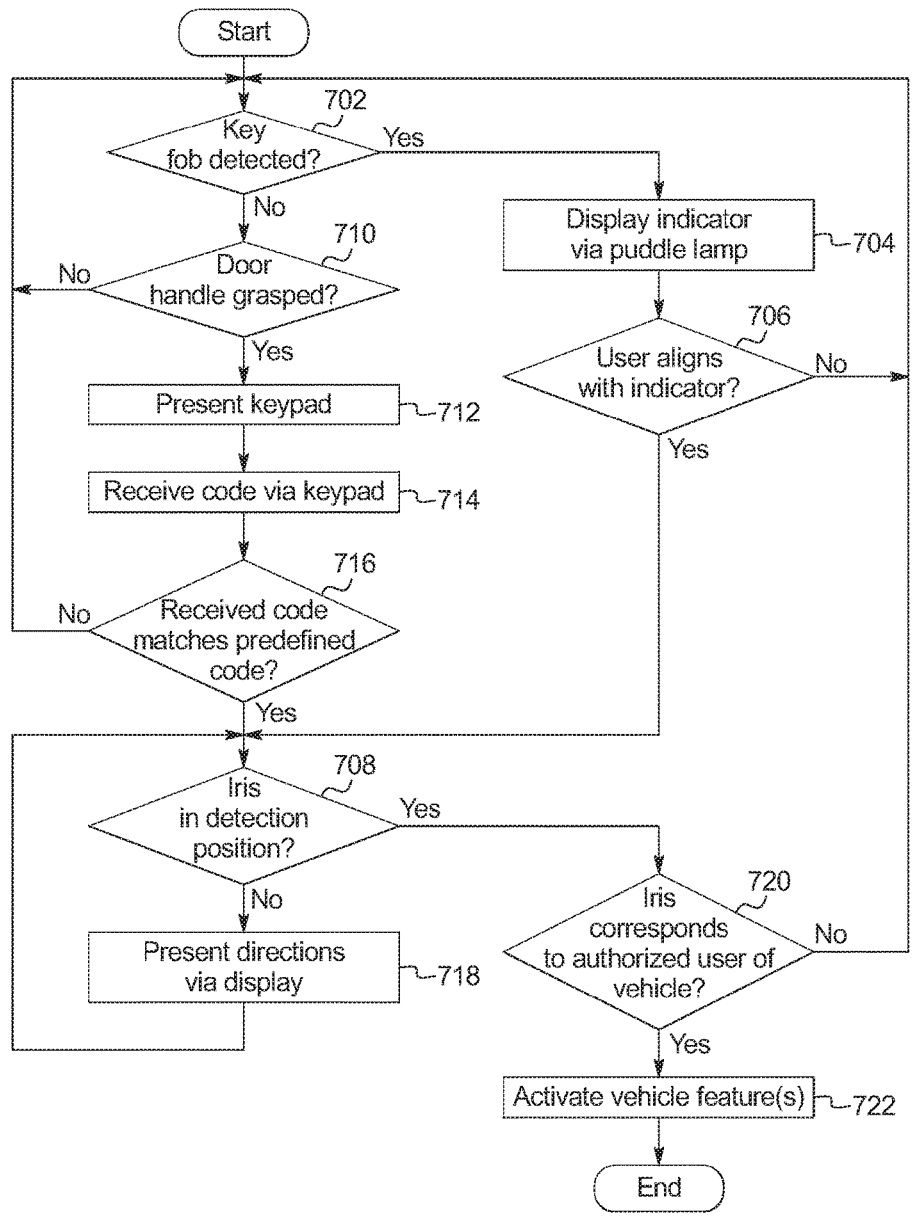
FIG. 7 is a flowchart to position irises for an iris recognition system for vehicle entry or activation in accordance with the teachings herein.

FIG. 7 is a flowchart of an example method 700 to position irises for an iris detection system for a vehicle entry, personalization, and/or activation. The flowchart of FIG. 7 is representative of machine readable instructions that are stored in memory (such as the memory 616 of FIG. 6) and include one or more programs which, when executed by a processor (such as the processor 614 of FIG. 6), cause the vehicle 100 to implement the example identification controller 114 of FIGS. 1 and 6. While the example program is described with reference to the flowchart illustrated in FIG. 7, many other methods of implementing the example identification controller 114 may alternatively be used. For example, the order of execution of the blocks may be rearranged, changed, eliminated, and/or combined to perform the method 700. Because the method 700 is disclosed in connection with the components of FIGS. 1-6, some functions of those components will not be described in detail below.

Initially, at block 702, the identification controller 114 determines whether a key fob (e.g., the key fob 106) and/or other mobile device functioning as a key has been detected via the communication module 102. In response to determining that the key fob 106 and/or other mobile device has been detected, the method 700 proceeds to block 704.

At block 704, the puddle lamp 208 projects the puddle light 210 that includes the indicator 212 onto the ground surface in front of the camera 206. At block 706, the identification controller 114 determines whether the user 104 aligns with the indicator 212 of the puddle light 210. In response to the identification controller 114 determining that the user 104 does not align with the indicator 212, the method 700 returns to block 702. Otherwise, in response to the identification controller 114 determining that the user 104 aligns with the indicator 212, the method 700 proceeds to block 708.

Returning to block 702, in response to determining that the key fob 106 and/or other mobile device has not been detected, the method 700 proceeds to block 710. At block 710, the identification controller 114 determines whether the handle 204 of the door 110 has been grasped by the user 104. For example, the identification controller 114 determines whether the handle 204 has been grasped via the door handle sensor 618. In response to the identification controller 114 determining that the handle 204 has not been grasped, the method 700 returns to block 702. Otherwise, in response to the identification controller 114 determining that the handle 204 has been grasped, the method 700 proceeds to block 712 at which the identification controller 114 presents a keypad via the UV display 410. At block 714, the identification controller 114 receives a code via the keypad.

At block 716, the identification controller 114 determines whether the received code matches a predefined code for authorized use of the vehicle 100. In response to the identification controller 114 determining that the received code does not correspond with a predefined code, the method 700 returns to block 702. Otherwise, in response to the identification controller 114 determining that the received code corresponds with a predefined code, the method 700 proceeds to block 708. In other examples, the method 700 proceeds to block 722 upon the identification controller 114 determining that the received code corresponds with a predefined code. Further, in other examples, the method 700 proceeds to block 708 in response to the identification controller 114 determining, at block 710, that the handle 204 has been grasped.

At block 708, the identification controller 114 determines whether the iris 406 (or face) is in position for the camera 206 to capture image(s) of the iris 406 (or face) for iris detection (or other camera-based recognition system such as a facial recognition system, a heart rate signature recognition system, etc.). In response to the identification controller 114 determining that the iris 406 is not in position, the method 700 proceeds to block 718 at which the identification controller 114 presents the directions 500 (e.g., visual instructions) to the user 104 via the UV display 410 to facilitate the user 104 in positioning the iris 406 for iris recognition. Additionally or alternatively, the identification controller 114 presents audio directions (e.g., via the speakers 218) to the user 104. Otherwise, in response to the identification controller 114 determining, at block 708, that the iris 406 is in position for iris recognition, the method 700 proceeds to block 720.

At block 720, the identification controller 114 determines whether the iris 406 (or face, or heart rate signature, etc.) of the user 104 corresponds with an iris (or face, or heart rate signature, etc.) of an authorized user of the vehicle 100. For example, the identification controller 114 utilizes iris recognition software (or other camera-based recognition software such as facial recognition software, heart rate signature recognition software, etc.) to determine whether the user 104 is an authorized user of the vehicle 100. In response to the identification controller 114 determining that the iris 406 of the user 104 does not correspond with an iris of an authorized user, the method 700 returns to block 702. Otherwise, in response to the identification controller 114 determining that the iris 406 of the user 104 corresponds with an iris of an authorized user, the method 700 proceeds to block 722 at which the identification controller 114 activates vehicle feature(s) of the vehicle 100 for the user 104 (e.g., for vehicle entry, to personalize settings).

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a window;
    a camera facing the window;
    a puddle lamp to project an indicator pointing toward the camera;
    a UV source; and
    a controller to:
        project, via the UV source, a display onto the window upon detecting a user aligns with the indicator;
        provide directions to the user, via the display, to position an iris in front of the camera; and
        activate a vehicle feature upon identifying the user via iris recognition.

2. The vehicle of claim 1, wherein the indicator projected by the puddle lamp includes footprints that are directed toward the camera.

3. The vehicle of claim 1, wherein the camera captures images to enable the controller to detect when the user aligns with the indicator.

4. The vehicle of claim 1, further including a sideview mirror adjacent to the window, the puddle lamp being positioned on the sideview mirror.

5. The vehicle of claim 4, further including a second camera that is positioned on the sideview mirror and is configured to capture images to enable the controller to detect when the user aligns with the indicator.

6. The vehicle of claim 1, wherein the vehicle feature activated by the controller includes unlocking a door to facilitate vehicle entry for the user.

7. The vehicle of claim 1, wherein the vehicle feature activated by the controller includes initiating a setting that corresponds to the user.

8. The vehicle of claim 1, wherein the window includes a UV ink layer that reflects UV light projected by the UV source onto the window to create the display on the window.

9. The vehicle of claim 1, wherein the display projected onto the window includes at least one of a set of eyes and a line of indicators that direct the user in positioning the iris in front of the camera.

10. The vehicle of claim 9, wherein the controller changes a color of the set of eyes to indicate to the user that the iris is in position for iris recognition.

11. The vehicle of claim 1, further including speakers that emit audible directions to the user for positioning the iris in front of the camera.

12. The vehicle of claim 1, further including a communication module configured to communicate with a key fob of the user via a wireless personal area network.

13. The vehicle of claim 12, wherein the puddle lamp projects the indicator in response to the controller detecting, via the communication module, that the key fob of the user is nearby.

14. The vehicle of claim 1, further including a door handle adjacent to the window.

15. The vehicle of claim 14, wherein the controller projects, via the UV source, a keypad onto the window in response to detecting that the user has grasped the door handle.

16. The vehicle of claim 15, wherein the controller:
opens a door to facilitate vehicle entry in response to receiving a first code via the keypad; and
provides the directions to position the iris in response to receiving a second code via the keypad.

17. A method comprising:
projecting, via a puddle lamp, an indicator pointing toward a vehicle camera that captures images through a vehicle window;
projecting, via a UV source, a display onto the vehicle window upon detecting that a user aligns with the indicator;
providing directions to the user, via the display, to position an iris in front of the vehicle camera; and
activating, via a processor, a vehicle feature upon identifying the user via iris recognition.

18. The method of claim 17, wherein providing the directions to position the iris in front of the vehicle camera includes projecting at least one of a set of eyes and a line of indicators onto the vehicle window.

19. The method of claim 17, wherein the puddle lamp projects the indicator in response to detecting, via a communication module, a key fob of the user.

20. The method of claim 17, further including:
projecting, via the UV source, a keypad onto the vehicle window in response to detecting that the user has grasped a door handle;
opening a door in response to receiving a first code via the keypad; and
providing the directions to position the iris in response to receiving a second code via the keypad.

* * * * *